(12) United States Patent
Wang et al.

(10) Patent No.: US 9,172,741 B2
(45) Date of Patent: Oct. 27, 2015

(54) MOBILE TERMINAL AND METHOD FOR IMPLEMENTING BROWSER THEREOF

(75) Inventors: Tao Wang, Shenzhen (CN); Qirui Li, Shenzhen (CN); Lizhang Liu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 276 days.

(21) Appl. No.: 13/990,381

(22) PCT Filed: Jul. 19, 2011

(86) PCT No.: PCT/CN2011/077305
§ 371 (c)(1),
(2), (4) Date: Jul. 1, 2013

(87) PCT Pub. No.: WO2012/079365
PCT Pub. Date: Jun. 21, 2012

(65) Prior Publication Data
US 2013/0275488 A1    Oct. 17, 2013

(30) Foreign Application Priority Data
Dec. 15, 2010 (CN) .......................... 2010 1 0590876

(51) Int. Cl.
*G06F 15/16* (2006.01)
*H04L 29/08* (2006.01)
(Continued)

(52) U.S. Cl.
CPC .......... *H04L 67/02* (2013.01); *G06F 17/30899* (2013.01); *H04W 4/18* (2013.01); *Y02B 60/188* (2013.01); *Y02B 60/50* (2013.01)

(58) Field of Classification Search
USPC ........................................................ 709/227
See application file for complete search history.

(56) References Cited
U.S. PATENT DOCUMENTS 6,430,624 B1 *  8/2002  Jamtgaard et al. ............ 709/246
2005/0033799 A1    2/2005  Shin et al.
(Continued)

FOREIGN PATENT DOCUMENTS

CN    1992603 A      7/2007
CN    101076100 A    11/2007
(Continued)

OTHER PUBLICATIONS

Joeng Kim et al: "pTHINC", Proceedings of the 15th International Conference on World Wide Web, WWW '06, Jan. 1, 2006, p. 143, XP055144948, New York, New York, USA, DOI: 10.1145/1135777.1135803, ISBN: 978-1-59-593323-2. (10 pages—see Supplementary European Search Report in European application No. 11849403.8 for relevant pages).
(Continued)

*Primary Examiner* — Alicia Baturay
(74) *Attorney, Agent, or Firm* — Oppedahl Patent Law Firm LLC

(57) ABSTRACT

The present disclosure provides a mobile terminal and a method for implementing a browser of the mobile terminal. The method comprises: the mobile terminal establishes a remote browser connection with a computing entity; and the mobile terminal remotely calls a browser engine to parse webpage data and render an image for data to be parsed through a distributed program interface of the browser engine provided by the computing entity, and receives frame dataflow from the computing entity. Through the present disclosure, the mobile terminal establishes a remote browser connection with the computing entity to share the browser engine of the computing entity based on distributed implementation as a component to the mobile terminal; the browser engine of the computing entity is remotely called to work to actually acquire the parsing capability of the CPU and other hardware resources of the computing entity; and the frame dataflow returned from the computing entity is received and presented. The mobile terminal not only acquires a relatively high computing capability but also has small power consumption; extra expense of the user is avoided and additional client software is not needed, and thereby improving the usability.

14 Claims, 3 Drawing Sheets

(51) Int. Cl.
*H04W 4/18* (2009.01)
*G06F 17/30* (2006.01)

(56) References Cited

U.S. PATENT DOCUMENTS

| | | | |
|---|---|---|---|
| 2007/0004436 A1 | 1/2007 | Stirbu | |
| 2007/0141985 A1* | 6/2007 | Parkkinen et al. | 455/41.2 |
| 2009/0228779 A1 | 9/2009 | Williamson et al. | |
| 2009/0234950 A1 | 9/2009 | Wikman et al. | |
| 2011/0022812 A1* | 1/2011 | van der Linden | G06F 9/5077 711/163 |
| 2012/0102084 A1* | 4/2012 | Hiltunen et al. | 709/201 |

FOREIGN PATENT DOCUMENTS

| | | |
|---|---|---|
| CN | 101316275 A | 12/2008 |
| CN | 101521680 A | 9/2009 |
| CN | 101557551 A | 10/2009 |
| CN | 101657032 A | 2/2010 |
| CN | 101778168 A | 7/2010 |
| CN | 102024048 A | 4/2011 |
| EP | 2003853 A1 | 12/2008 |
| WO | 2012079365 A1 | 6/2012 |

OTHER PUBLICATIONS

Supplementary European Search Report in European application No. 11849403.8, mailed on Oct. 30, 2014. (8 pages—see entire document).

International Search Report in international application No. PCT/CN2011/077305, mailed on Sep. 29, 2011.

English Translation of the Written Opinion of the International Search Authority in international application No. PCT/CN2011/077305, mailed on Sep. 29, 2011.

* cited by examiner

MOBILE TERMINAL AND METHOD FOR IMPLEMENTING BROWSER THEREOF

TECHNICAL FIELD

The present disclosure relates to the field of communication, in particular to a mobile terminal and a method for implementing a browser thereof.

BACKGROUND

After the entry into Third Generation (3G) mobile communication era, the function of mobile terminal is richer and richer, especially the browser is becoming a common function for mobile terminal users. However, the mobile terminal is inferior to a computer in computing processing capability, and data parsing and image rendition speed, which results in the problems of unsmooth refreshing of webpage and the like when a user browses a webpage through the browser in the mobile terminal.

Therefore, an Advanced RISC Machine (ARM) processor and a mobile application processor with higher performance are applied in the mobile terminal to certainly improve the processing performance of the mobile terminal and further improve the effect of browsing web pages through the browser in the mobile terminal. However, the power consumption is also increased along with the improvement of the processing performance of the mobile terminal; meanwhile, the popularization of the high-performance processor will take some time due to its price factor, thus, the current situations of a significant market share of middle and low end mobile terminals and poor computing capacity of function mobile terminals are still not solved effectively.

Another method is to obtain a powerful computing and storage capability provided by distributed processing through a data centre by cloud computing, specifically the mobile terminal accessing 3G network or Internet. However, this method needs to occupy the bandwidth of a communication network and the user charge expense is relatively high; and meanwhile, the radio frequency part of the mobile terminal needs much power to maintain network connection.

SUMMARY

In view of this, the main objective of the disclosure is to provide a mobile terminal and a method for implementing a browser of the mobile terminal, so as to improve the performance and reduce the power consumption of the browser of the mobile terminal.

To achieve the objective above, the technical scheme of the disclosure is implemented as follows.

The method for implementing the browser of the mobile terminal includes the following steps:
  the mobile terminal establishes a remote browser connection with a computing entity; and
  the mobile terminal remotely calls a browser engine to parse webpage data and render an image for data to be parsed through a distributed program interface of the browser engine provided by the computing entity, and receives frame dataflow from the computing entity.

Furthermore, before the mobile terminal establishes the remote browser connection with the computing entity, the method may further include:
  the mobile terminal searches for the computing entity in a short distance wireless communication way; and
  the mobile terminal sends a wireless connection request to the found computing entity, and establishes a wireless connection with the computing entity after the mobile terminal receives access agreement information from the computing entity.

The step that the mobile terminal establishes the remote browser connection with the computing entity may include:
  the mobile terminal starts its own remote client sub-module to remotely log in the computing entity; and
  the mobile terminal starts its own transmission adaption task sub-module to complete the establishment of the remote browser connection with the computing entity.

Furthermore, after the mobile terminal establishes the remote browser connection with the computing entity, the method may further include:
  the mobile terminal starts a remote browser engine mode after the mobile terminal receives remote browser selection information from a user,
  terminating a software task of a mobile application processor, disconnect the data communication between the Central Processing Unit (CPU) of the mobile terminal and the mobile application processor, and sets the mobile application processor to a hibernate state.

The step that the mobile terminal remotely calls the browser engine to parse the webpage data and render the image for the data to be parsed through the distributed program interface of the browser engine provided by the computing entity may include:
  the mobile terminal starts its own virtual coprocessor task module, receives a webpage data block to be parsed and a parsing command from its own CPU, and sends the webpage data block and the parsing command to a remote browser engine task module after buffering them;
  the mobile terminal starts the remote browser engine task module, converts the parsing command sent from the virtual coprocessor task module into a remote call command for the distributed program interface of the browser engine, binds and packages the remote call command with the webpage data block sent from the virtual coprocessor task module, and sends the data packet to the transmission adaption task sub-module;
  the transmission adaption task sub-module converts a wireless protocol data format of the received data packet, and sends the converted data packet to a wireless task module of the mobile terminal, and the wireless task module of the mobile terminal sends the data packet to the wireless task module of the computing entity.

Furthermore, the method may further include:
  when it is detected that the remote browser connection is disconnected, the mobile terminal switches the remote browser engine mode to a local browser engine mode, closes its own virtual coprocessor task module, the remote client sub-module, the remote browser engine task module and the transmission adaption task sub-module, wakes up the mobile application processor of the mobile terminal and starts the software task of the mobile application processor.

The mobile terminal includes a wireless task module, a CPU and a mobile application processor task module, and the mobile terminal may further include: a remote browser connection module, a virtual coprocessor task module and a remote browser engine task module;
  the remote browser connection module is configured to establish a remote browser connection with a computing entity;

the virtual coprocessor task module is configured to receive and buffer data to be parsed sent from the CPU, and send the data to be parsed to the remote browser engine task module;

the remote browser engine task module is configured to remotely call a browser engine to parse webpage data and render an image for data to be parsed through a distributed program interface of the browser engine provided by the computing entity; and the wireless task module is configured to receive frame dataflow returned from the computing entity.

Furthermore, the wireless task module may specifically be configured to search for the computing entity, send a wireless connection request to the found computing entity, and establish a wireless connection with the computing entity after receiving access agreement information from the computing entity.

Furthermore, the remote browser connection module may further include a remote client sub-module and a transmission adaption task sub-module, wherein the remote client sub-module is configured to remotely log in the computing entity; and the transmission adaption task sub-module is configured to receive a data packet from the remote client sub-module, communicate with the wireless task module and complete the establishment of the remote browser connection with the computing entity.

Furthermore, the CPU may be configured to, after receiving remote browser selection information from a user, enable a remote browser engine mode, terminate a software task of a mobile application processor of the mobile terminal, disconnect the data communication between the CPU and the mobile application processor, and set the mobile application processor to a hibernate state.

Furthermore, the virtual coprocessor task module may specifically be configured to receive a webpage datablock to be parsed and a parsing command from its own CPU, buffer the webpage data block and the parsing command, and send them to the remote browser engine task module;

the remote browser engine task module is configured to convert the parsing command sent from the virtual coprocessor task module into a remote call command for the distributed program interface of the browser engine, bind and package the remote call command with the data block sent from the virtual coprocessor task module, and send the data packet to the transmission adaption task sub-module; and the transmission adaption task sub-module is configured to convert a wireless protocol data format of the received data packet and send the converted data packet to the wireless task module of the mobile terminal, and the wireless task module of the mobile terminal sends the data packet to the wireless task module of the computing entity.

Furthermore, the CPU is further configured to, when it is detected that the remote browser connection of the remote browser connection module is disconnected, switch the remote browser engine mode to a local browser engine mode, close the remote browser connection module, the virtual coprocessor task module and the remote browser engine task module, and wake up the mobile application processor and start the software task of the mobile application processor.

According to the mobile terminal and the method for implementing the browser of the mobile terminal provided by the present disclosure, the mobile terminal establishes a remote browser connection with the computing entity having established wireless connection, the browser engine of the computing entity based on distributed implementation is shared to the mobile terminal as a component; and the browser engine is remotely called by the distributed program interface of the browser engine provided by the computing entity to process the data to be parsed by the mobile terminal, receive the frame dataflow from the computing entity, and display a webpage by the browser of the mobile terminal. Therefore, the performance of the browser of the mobile terminal is improved, the power consumption is small, extra expense of the user is avoided and the cost is saved; and in addition, additional client software is not needed, thereby improving the usability.

DETAILED DESCRIPTION

The basic idea of the disclosure is: a mobile terminal establishes a remote browser connection with a computing entity, remotely calls a browser engine to parse webpage data and render an image for data to be parsed through a distributed program interface of the browser engine provided by the computing entity, and receives frame dataflow from the computing entity.

The disclosure is explained below in detail with reference to the embodiments and accompanying drawings below to show the objective, technical scheme and advantages of the disclosure more clearly.

Figure 1:
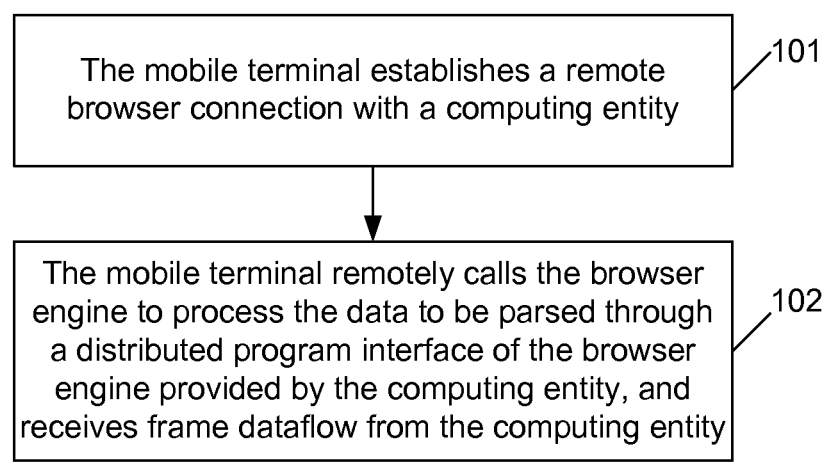
FIG. 1 is a diagram showing the flow of a method for implementing a browser of a mobile terminal of the present disclosure.

FIG. 1 shows the flow of a method for implementing a browser of a mobile terminal of the disclosure, as shown, the method includes the following steps:

Step 101: The mobile terminal establishes a remote browser connection with a computing entity, specifically, the mobile terminal starts a remote client sub-module of its own remote browser connection module to remotely log in the computing entity having an established wireless connection with the mobile terminal, and then starts a transmission adaption task sub-module of its own remote browser connection module; at this moment, the establishment of the remote browser connection between the mobile terminal and the computing entity is completed.

Step 102: The mobile terminal remotely calls the browser engine of the computing entity to parse webpage data to be parsed and render an image for data to be parsed through the distributed program interface of the browser engine provided by the computing entity, and receives frame dataflow from the computing entity;

specifically, the mobile terminal converts a parsing command into a remote call command for the distributed program interface of the browser engine, binds and packages the remote call command with a webpage data block to be parsed and sends the data packet to the computing entity through its own wireless task module, and parses the webpage data, renders the image and performs other processing by the browser engine provided by the computing entity, and receives frame dataflow from the computing entity for presentation.

Figure 2:
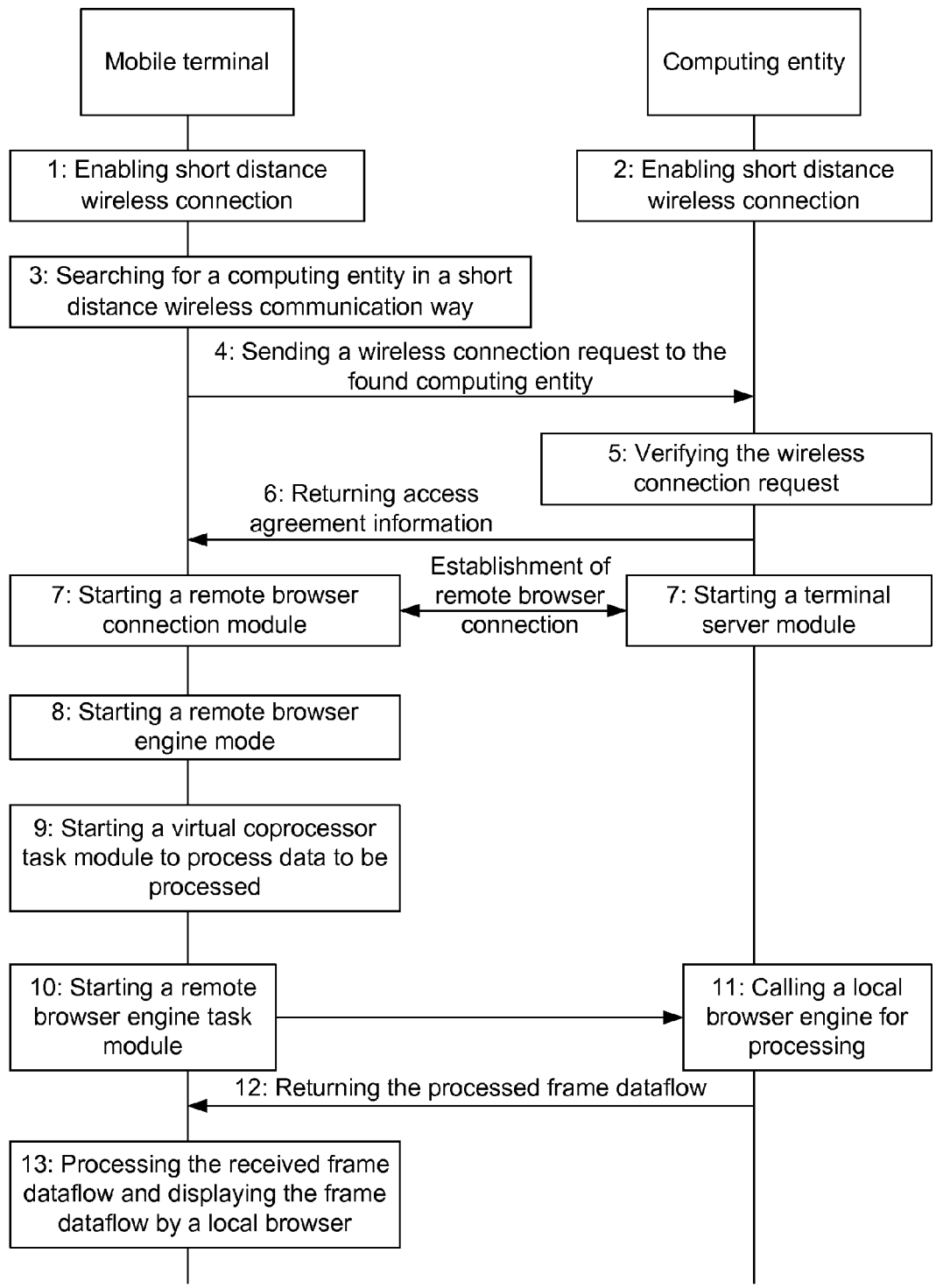
FIG. 2 is a diagram showing the processing flow in a specific embodiment of a method for implementing a browser of a mobile terminal of the present disclosure.

FIG. 2 shows the processing flow in a specific embodiment of a method for implementing a browser of a mobile terminal of the disclosure, as shown in FIG. 2, the embodiment includes the following steps:

Step 1: The mobile terminal receives a short distance wireless connection enabling request from a user, and enables its own short distance wireless connection function, wherein the short distance wireless connection of the mobile terminal can be Bluetooth, WIFI, wireless USB and so on.

Step 2: The computing entity enables its own short distance wireless connection, in the step, the computing entity can be equipment with a powerful computing capability, such as a computer; and specifically, the computing entity enables its own short distance wireless connection function when receiving the short distance wireless connection enabling request from the user.

In addition, it should be appreciated that the computing entity in the step refers to the computing entity in the effective range of the short distance wireless connection of the mobile terminal, and Steps 1 and 2 can be implemented in any sequence.

Steps 3 to 4: The mobile terminal searches for the computing entity in the adjacent areas in a short distance wireless communication way, and sends a wireless connection request to the computing entity when the computing entity is found, specifically, the mobile terminal searches for the computing entity in the effective range of its own short distance wireless connection, and can send the wireless connection request to the computing entity when finding the computing entity also enabling the short distance wireless connection.

Steps 5 to 6: The computing entity verifies the received wireless connection request, and returns access agreement information to the mobile terminal when the verification is passed; and at this moment, the establishment of the wireless connection between the mobile terminal and the computing entity is completed;

specifically, in the step, the verification of the wireless connection request performed by the computing entity further includes: the computing entity determines whether to admit the access request of the mobile terminal according to its own running condition; and returns access disagreement information to the mobile terminal if the access request will not be admitted; wherein under the condition of high CPU utilization rate of the computing entity, large running process number and the like, the computing entity may return the access disagreement information to the mobile terminal; otherwise, under the condition of good CPU usage state of the computing entity and small running process number, the computing entity returns access agreement information to the mobile terminal.

Step 7: The mobile terminal starts its own remote browser connection module and the computing entity starts its own terminal server module to establish remote browser connection therebetween;

specifically, in the step, the mobile terminal starts a remote client sub-module of the remote browser connection module at first, and the remote client sub-module can be implemented by a virtualization technology, such as the remote application technology of Microsoft; and therefore when the mobile terminal remotely logs in the computing entity, it is unnecessary to display the desktop of the computing entity on the mobile terminal, so that a lot of display data needed for transmitting the desktop image of the computing entity to the mobile terminal is avoided and the implementation is more simple and convenient; then, a transmission adaption task sub-module of the remote browser connection module is started, the transmission adaption task sub-module receives data sent from the remote client sub-module and establish connection with the wireless task module of the mobile terminal, so as to complete the communication task with the computing entity.

The computing entity starts a terminal server module to set related environments such a distributed component service; the browser engine based on distributed implementation is shared to the mobile terminal as a component and further serves as the browser engine of the mobile terminal; specifically, the mobile terminal is added to the distributed component service, and the remote browser engine is added in the distributed component service at the same time; at this moment, the browser list of the mobile terminal displays the shared browser engine, and correspondingly, the displayed browser engine can be shared by the mobile terminal.

Step 8: The mobile terminal enables a remote browser engine mode after receiving remote browser selection information from a user, specifically, in the step, the browser module of the mobile terminal provides the user with a browser engine mode selection function, including a local browser engine mode and a remote browser engine mode; when the mobile terminal receives the remote browser selection information, the mobile terminal switches to the remote browser engine mode, and when the mobile terminal further receives the remote browser engine selection information input by the user according to the browser list provided by the mobile terminal, the mobile terminal terminates the software task of a mobile application processor and disconnects the data communication between its own internal mobile application processor and the CPU; and meanwhile, the mobile application processor can be set to a hibernate state in order to save the power consumption of the mobile terminal.

Steps 9 to 10: The mobile terminal starts a virtual coprocessor task module, receives webpage data to be parsed and a parsing command from the CPU, starts the remote browser engine task module, and sends the webpage data block to be parsed and the parsing command to the remote browser engine task module after buffering them; and the remote browser engine task module calls the browser engine to parse the webpage data to be parsed through the distributed program interface of the remote browser engine, specifically, after the mobile terminal starts the virtual coprocessor task module, the virtual coprocessor task module can receive the webpage data block to be parsed and the parsing command from the CPU continuously, and send them to the remote browser engine task module after buffering them and other processing; meanwhile, the mobile terminal starts the remote browser engine task module, the remote browser engine task module receives the webpage data block and parsing command sent from the virtual coprocessor task module and converts the parsing command into a remote call command; specifically, the remote browser engine task module converts the parsing command sent from the virtual coprocessor task module into the remote call command for the distributed program interface of the browser engine, binds and packages the remote call command with the webpage data block sent from the virtual coprocessor task module, and sends the data packet to the transmission adaption task sub-module; and the transmission adaption task sub-module converts a wireless protocol data format of the received data packet and then sends the converted data packet to the wireless task module which sends the data to the computing entity.

Steps 11 to 12: The wireless task module of the computing entity sends the received data to the browser engine; and the browser engine locally parses the data and returns frame dataflow to the mobile terminal;

specifically, in the step, the wireless task module of the computing entity converts the format of the received data to obtain a data packet including the data block to be parsed and the parsing command, and sends the data packet to the browser engine; and the browser engine extracts the parsing command and the data block from the data packet, calls the local CPU and other hardware to parse the webpage data and render the image and returns the obtained frame dataflow to the mobile terminal.

Step 13: The mobile terminal processes the received frame dataflow and displays it through a local browser;

specifically, the wireless task module of the mobile terminal sends the received data to the transmission adaption task sub-module, the transmission adaption task sub-module converts the data of the wireless protocol data format into the data which can be processed by the virtual coprocessor task module and then sends the converted data to the virtual coprocessor task module; the virtual coprocessor task module processes the received data, such as buffering and accelerating, and then provides the finally obtained data to the browser of the mobile terminal; and the browser calls a local Liquid Crystal Display (LCD) of the mobile terminal and other hardware for presentation.

In addition, when the CPU of the mobile terminal determines that the remote browser connection between the mobile terminal and the computing entity established in Step 7 is disconnected, the CPU of the mobile terminal switches the remote browser engine mode into the local browser engine mode, closes the virtual coprocessor task module, the remote client task sub-module, the remote browser engine task module, the transmission adaption task sub-module and the like, enables the software task of the mobile application processor and wakes up the mobile application processor, wherein the disconnection of the remote browser connection can be conditions that a message for terminating the remote browser engine mode is received from a user, or it is detected that the mobile terminal is not in the service range of the computing entity, or the computing entity stops providing the mobile terminal with the remote browser engine service and the like.

Figure 3:
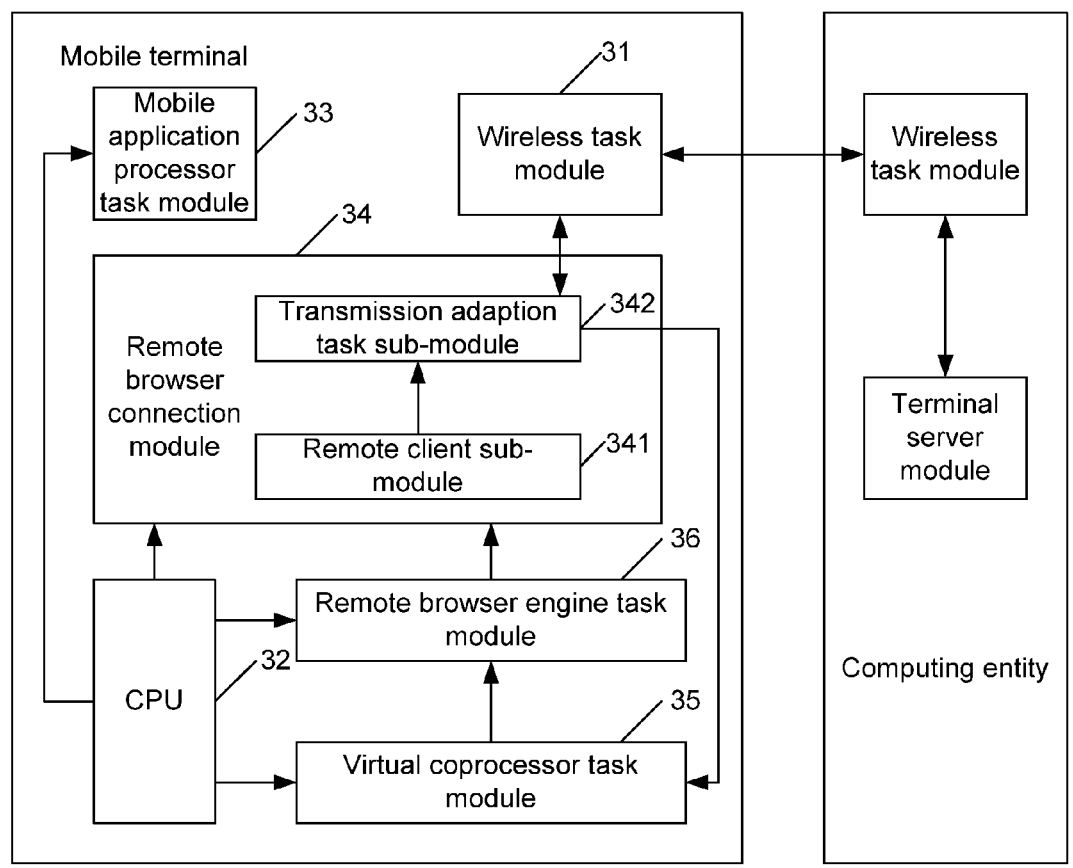
FIG. 3 is a diagram showing the composition structure of a mobile terminal of the present disclosure.

FIG. 3 shows the structure of a mobile terminal of the present disclosure, as shown in FIG. 3, the mobile terminal includes: a wireless task module 31, a CPU 32, a mobile application processor task module 33, a remote browser connection module 34. a virtual coprocessor task module 35 and a remote browser engine task module 36, wherein the wireless task module 31 is configured to receive frame dataflow returned from a computing entity;

the remote browser connection module 34 is configured to establish a remote browser connection with the computing entity;

the virtual coprocessor task module 35 is configured to receive data to be parsed sent from the CPU 32, and send the data to the remote browser engine task module 36 after buffering them; and the remote browser engine task module 36 is configured to remotely call a browser engine to parse webpage data and render an image for data to be parsed through a distributed program interface of the browser engine provided by the computing entity.

Furthermore, the wireless task module 31 is specifically configured to search for the computing entity, send a wireless connection request to the found computing entity, and establish wireless connection with the computing entity after receiving access agreement information from the computing entity.

Furthermore, the remote browser connection module 34 further includes a remote client sub-module 341 and a transmission adaption task sub-module 342, wherein the remote client sub-module 341 is configured to remotely log in the computing entity; and the transmission adaption task sub-module 342 is configured to receive a data packet from the remote client sub-module 341, communicate with the wireless task module 31 and complete the establishment of remote browser connection with the computing entity.

The computing entity starts its own terminal server module to set related environments such as a distributed component service; the browser engine based on distributed implementation is shared to the mobile terminal as a component and further serves as the browser engine of the mobile terminal; specifically, the mobile terminal is added to the distributed component service, and the remote browser engine is added in the distributed component service at the same time; at this moment, the browser list of the mobile terminal displays the shared remote browser engine, and correspondingly, the displayed browser engine can be shared by the mobile terminal.

Furthermore, the CPU 32 is configured to, after receiving remote browser selection information from a user, enable a remote browser engine mode, terminate the mobile application processor software task of the mobile application processor task module 33 of the mobile terminal, disconnect the data communication between the mobile application processor of the mobile application processor task module 33 of the mobile terminal and the CPU 32, and set the mobile application processor to a hibernate state.

Furthermore, the virtual coprocessor task module 35 is specifically configured to receive a webpage data block to be parsed and a parsing command from the CPU 32, and send the webpage data block and the parsing command to a remote browser engine task module 36 after buffering them;

the remote browser engine task module 36 is configured to convert the parsing command from the virtual coprocessor task module 35 into a remote call command for the distributed program interface of the browser engine, bind and package the remote call command with the data block from the virtual coprocessor task module 35, and send the data packet to the transmission adaption task sub-module 342; and the transmission adaption task sub-module 342 converts a wireless protocol data format of the received data packet, and sends the converted data packet to a wireless task module 31 of the mobile terminal, and the wireless task module 31 of the mobile terminal sends the data packet to the wireless task module of the computing entity.

The local browser engine of the computing entity pareses the webpage data and renders the image by using the CPU and other hardware, and then returns the obtained frame dataflow to the mobile terminal by the wireless task module of the computing entity; the wireless task module 31 of the mobile terminal receives the frame dataflow and sends the received data to the transmission adaption task sub-module 342; the transmission adaption task sub-module 342 converts the data of the wireless protocol data format into the data which can be processed by the virtual coprocessor task module 35 and then sends the converted data to the virtual coprocessor task module 35; the virtual coprocessor task module 35 processes the received data, such as buffering and accelerating, and then provides the finally obtained data to the browser of the mobile terminal; and the browser calls the local LCD of the mobile terminal and other hardware for presentation.

Furthermore, the CPU 32 is further configured to, when detecting that the remote browser connection of the remote browser connection module 34 is disconnected, switch the remote browser engine mode to a local browser engine mode, close the remote browser connection module 34, the virtual coprocessor task module 35 and the remote browser engine task module 36, and start the mobile application processor task module 33, specifically waking up the mobile application processor and starting the software task of the mobile application processor.

The above is only the preferred embodiment of the disclosure, and not intended to limit the scope of protection of the disclosure.

The invention claimed is:

1. A method for implementing a browser of a mobile terminal, comprising:
    establishing, by the mobile terminal, a remote browser connection with a computing entity;
    starting, by the mobile terminal, a remote browser engine mode after the mobile terminal receives remote browser selection information from a user;
    starting, by the mobile terminal, its own virtual coprocessor task module, receiving a webpage data block to be parsed and a parsing command from its own CPU, buffering the webpage data block and the parsing command and sending them to a remote browser engine task module;
    starting, by the mobile terminal, the remote browser engine task module, converting the parsing command sent from the virtual coprocessor task module into a remote call command for the distributed program interface of the browser engine, binding and packaging the remote call command with the webpage data block sent from the virtual coprocessor task module, and sending the data packet to the transmission adaption task sub-module;
    converting, by the transmission adaption task sub-module, a wireless protocol data format of the received data packet, and then sending the converted data packet to a wireless task module of the mobile terminal, and sending, by the wireless task module of the mobile terminal, the converted data packet to a wireless task module of the computing entity;
    receiving frame dataflow from the computing entity.

2. The method according to claim 1, wherein before the step of establishing, by the mobile terminal, a remote browser connection with a computing entity, the method further comprises:
    searching, by the mobile terminal, for the computing entity in a short distance wireless communication way; and
    sending, by the mobile terminal, a wireless connection request to the found computing entity, and establishing a wireless connection with the computing entity after the mobile terminal receives access agreement information from the computing entity.

3. The method according to claim 2, wherein after the step of establishing, by the mobile terminal, a remote browser connection with a computing entity, the method further comprises:
    terminating a software task of a mobile application processor, disconnecting the data communication between the Central Processing Unit (CPU) of the mobile terminal and the mobile application processor, and setting the mobile application processor to a hibernate state.

4. The method according to claim 1, wherein the step of establishing, by the mobile terminal, a remote browser connection with a computing entity comprises:
    starting, by the mobile terminal, its own remote client sub-module to remotely log in the computing entity; and
    starting, by the mobile terminal, its own transmission adaption task sub-module to complete the establishment of the remote browser connection with the computing entity.

5. The method according to claim 4, wherein after the step of establishing, by the mobile terminal, a remote browser connection with a computing entity, the method further comprises:
    terminating a software task of a mobile application processor, disconnecting the data communication between the Central Processing Unit (CPU) of the mobile terminal and the mobile application processor, and setting the mobile application processor to a hibernate state.

6. The method according to claim 1, wherein after the step of establishing, by the mobile terminal, a remote browser connection with a computing entity, the method further comprises:
    terminating a software task of a mobile application processor, disconnecting the data communication between the Central Processing Unit (CPU) of the mobile terminal and the mobile application processor, and setting the mobile application processor to a hibernate state.

7. The method according to claim 1, further comprising:
    switching, by the mobile terminal, the remote browser engine mode to a local browser engine mode, closing its own virtual coprocessor task module, the remote client sub-module, the remote browser engine task module and the transmission adaption task sub-module, and waking up the mobile application processor of the mobile terminal and starting the software task of the mobile application processor when the mobile terminal detects that the remote browser connection is disconnected.

8. A mobile terminal, comprising a wireless task module, a CPU and a mobile application processor task module, and the mobile terminal further comprising: a remote browser connection module, a virtual coprocessor task module and a remote browser engine task module; wherein the remote browser connection module further comprises a remote client sub-module and a transmission adaption task sub-module;
    the CPU is configured to, after receiving remote browser selection information from a user, start a remote browser engine mode;
    the CPU executing the remote browser connection module is configured to establish a remote browser connection with a computing entity;
    the CPU executing the virtual coprocessor task module is configured to receive a webpage data block to be parsed and a parsing command from its own CPU, buffer the webpage data block and the parsing command, and send them to the remote browser engine task module;
    the CPU executing the remote browser engine task module is configured to convert the parsing command sent from the virtual coprocessor task module into a remote call command for the distributed program interface of the browser engine, bind and package the remote call command with the data block sent from the virtual coprocessor task module, and send the data packet to the transmission adaption task sub-module;

the CPU executing the transmission adaption task sub-module is configured to convert a wireless protocol data format of the received data packet and send the converted data packet to the wireless task module of the mobile terminal, and the wireless task module of the mobile terminal sends the data packet to the wireless task module of the computing entity; and the CPU executing the wireless task module is configured to send the converted data packet to the wireless task module of the computing entity and receive frame data-flow returned from the computing entity.

9. The mobile terminal according to claim 8, wherein the CPU executing the wireless task module is specifically configured to search for the computing entity, send a wireless connection request to the found computing entity, and establish a wireless connection with the computing entity after the mobile terminal receives access agreement information from the computing entity.

10. The mobile terminal according to claim 9, wherein the CPU is configured to terminate a software task of a mobile application processor of the mobile terminal, disconnect the data communication between the CPU and the mobile application processor, and set the mobile application processor to a hibernate state.

11. The mobile terminal according to claim 8, wherein the CPU executing the remote client sub-module is configured to remotely log in the computing entity; and the CPU executing the transmission adaption task sub-module is configured to receive a data packet sent from the remote client sub-module, communicate with the wireless task module and complete the establishment of the remote browser connection with the computing entity.

12. The mobile terminal according to claim 11, wherein the CPU is configured to terminate a software task of a mobile application processor of the mobile terminal, disconnect the data communication between the CPU and the mobile application processor, and set the mobile application processor to a hibernate state.

13. The mobile terminal according to claim 8, wherein the CPU is configured to terminate a software task of a mobile application processor of the mobile terminal, disconnect the data communication between the CPU and the mobile application processor, and set the mobile application processor to a hibernate state.

14. The mobile terminal according to claim 8, wherein the CPU is further configured to, when it is detected that the remote browser connection of the remote browser connection module is disconnected, switch the remote browser engine mode to a local browser engine mode, close the remote browser connection module, the virtual coprocessor task module and the remote browser engine task module, and wake up the mobile application processor and start the software task of the mobile application processor.

* * * * *